June 26, 1956     M. E. FOWLER ET AL     2,751,785

RATE OF CLIMB METER

Filed Dec. 22, 1952     2 Sheets-Sheet 1

INVENTORS
MAURICE E. FOWLER
THEODORE R. WILLIS
BY

*Marin Moody*

ATTORNEY

June 26, 1956     M. E. FOWLER ET AL     2,751,785
RATE OF CLIMB METER

Filed Dec. 22, 1952     2 Sheets-Sheet 2

INVENTORS
MAURICE E. FOWLER
THEODORE R. WILLIS
BY
ATTORNEY

United States Patent Office 2,751,785
Patented June 26, 1956

2,751,785
RATE OF CLIMB METER

Maurice E. Fowler, San Diego, Calif., and Theodore R. Willis, Cedar Rapids, Iowa, assignors to Collins Radio Company, Cedar Rapids, Iowa, a corporation of Iowa Application December 22, 1952, Serial No. 327,324

7 Claims. (Cl. 73—179)

This invention relates in general to rate of climb meters, and in particular to a meter which has time lag removed.

Rate of climb indicating devices are used for indicating to a pilot of an aircraft his rate of ascent or descent. They have a pressure responsive element such as a bellows, which may be constructed with one or more diaphragms in a manner well known in the art, mounted in a container with the inside of the diaphragm connected to the outer pressure and the inside of the container connected to the outer pressure through a slow leak. This causes a differential in pressure between the inside and the outside of the diaphragm when altitude changes. Because of the slow leak, a time lag always results in the indication of the device. This is because when the plane is leveling off after an ascent or descent, a certain length of time is required before the pressures equalize on the outside and inside of the diaphragm.

It is an object of this invention, therefore, to provide an improved rate of climb indicator which compensates for the inherent time lag in conventional rate of climb indicators.

Yet another object of this invention is to provide a rate of climb indicator which includes a correcting device that eliminates the normal time lag encountered in such instruments.

Still another object of this invention is to provide a rate of climb indicator which utilizes a mechanical system to anticipate the normal time lag present in rate of climb instruments.

A feature of this invention is found in the provision for a rate of climb instrument which has an extension connected to the normal control arm upon which are mounted mechanical elements, such as springs, masses, and dashpots, so as to remove the inherent time lag in a rate of climb indicator.

Further objects, features and advantages of this invention will become apparent from the following description and claims when read in view of the drawings, in which:

Figure 1:
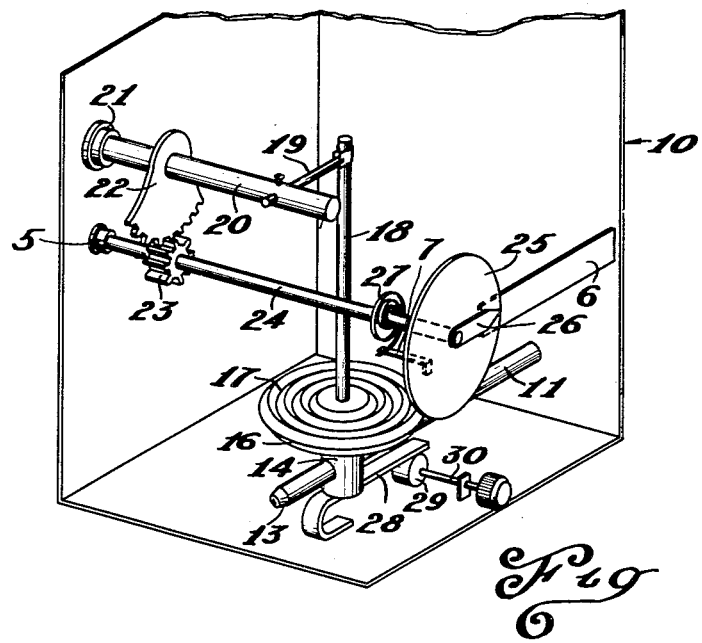
Figure 1 is a broken view of a conventional rate of climb meter.

Figure 1 illustrates a conventional rate of climb indicator and includes a container 10 which has a transverse tube 11 extending through one wall thereof, with one end of the tube 12 opening into the atmosphere external of the container and the opposite end 13 opening into the container. The opening 13, however, is small so that changes in altitude will cause a differential in pressure between the outside and the inside of the container. If the outside pressure becomes constant, the inside pressure will approach and finally equal the outside pressure.

A block 14 is attached to the tube 11 intermediate its ends within the container 10 and is formed with a central opening 15 which communicates with the tube 11 and which opens into a pair of diaphragms 16 and 17 that are joined at their outer periphery so as to form a bellows. The diaphragm 17 has a shaft 18 connected to its center which extends upwardly and pivotally engages a transverse shaft 19 which is rigidly attached to a third shaft 20.

The shaft 20 is rotatably supported in suitable bearings 21 and carries a partial gear 22 thereon. The gear 22 drives a meter movement comprising a small gear 23 mounted on a shaft 24 which is rotatably supported in a suitable bearing 5 on the container 10. A pointer 26 is mounted on the end of shaft 24 and indicates the rate of climb. A dial 25 is supported by a bracket 6 from the container 10 and the shaft 24 passes therethrough.

A coil spring 27 is connected to the shaft 24 and to an arm 7 which is supported by the dial 25.

The lower end of the block 14 rests on a hairpin spring 28 which is connected to the container 10 and a cam 29 supports the spring 28 so as to adjust the zero position of the meter. It is to be realized that the tube 11 is flexible. Cam 29 is supported by shaft 30.

Shaft 30 is rotatably supported in the container 10 and passes therethrough in a fluid seal. Rotation of shaft 30 controls the zero adjustment of the rate of climb meter.

Figure 2:
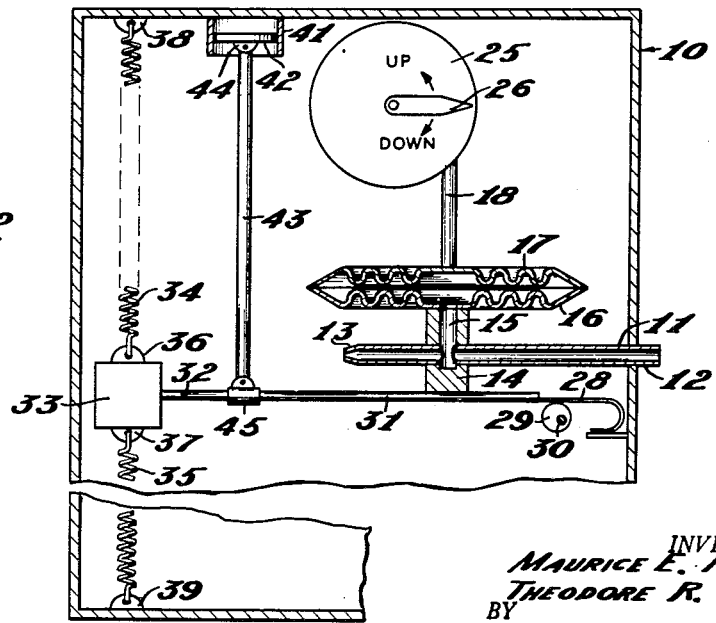
Figure 2 is a sectional view of the corrected rate of climb meter.

The apparatus shown in Figure 1 has an inherent time lag and to eliminate this time lag, a structure according to Figure 2 is proposed wherein the block 14 is supported on a shaft 31 which is connected to the spring 28. Shaft 31 supports at its outer end 32 a mass 33. A pair of springs 34 and 35 are connected by suitable brackets 36 and 37 to either side of the mass 33 and to opposite sides of the container by suitable brackets 38 and 39.

A dashpot comprising a cylinder 41 is connected to the container 10 and a piston 42 is received therein. A shaft 43 is pivotally connected to the piston 42 by a suitable bracket 44 and is attached to the shaft 31 by a suitable sleeve 45.

If the springs 34 and 35, the mass 33, and the dashpot are chosen in a correct manner, the time lag of the rate of climb meter will be eliminated so that it will indicate at all times the correct vertical velocity. This is true because the addition of the mechanical elements compensate for the time lag.

To illustrate and prove that the springs, mass and dashpot eliminate the time lag, an example may be considered. With a particular instrument, applicant observed that the transfer function between the velocity read and the true velocity is equal to (1) $$\frac{1}{1+25P}$$

where P is the operator of the La Place transform. The instrument therefore reads (2) $$\frac{\dot{h}}{1+25P}$$

where $\dot{h}$ is vertical velocity. Suppose to this quantity is added a factor of (3) $$\frac{25\ddot{h}}{1+25P}$$

where $\ddot{h}$ is the vertical acceleration, to obtain the equation:

(4) $$\frac{\dot{h}}{1+25P}+\frac{25\ddot{h}}{1+25P}=\frac{\dot{h}+25\ddot{h}}{1+25P}=\frac{\dot{h}(1+25P)}{1+25P}=\dot{h}$$

Thus, by adding a factor of (5) $$\frac{25\ddot{h}}{1+25P}$$

to the meter, it will be corrected so that it reads the true vertical velocity. To accomplish this, the equation of motion of the end 32 of shaft 31 may be written as (6) $$f = m\frac{d^2x}{dt^2} + D\frac{dx}{dt} + Kx$$

where $x$ is the vertical movement of the end 32 of shaft 31, $m$ is the mass of the member 33, D is the damping constant of the dashpot 44, and K is the combined spring constant of springs 34 and 35, and $f$ is the total force. This equation assumes that the mass, springs and dashpot are connected to shaft 31 at substantially the same place. Changing Equation 6 into operator form, and solving for $x/f$, the equation (7) $$\frac{x}{f} = \frac{1}{(mP^2 + DP + K)}$$

may be obtained which equals (8) $$\frac{x}{f} = \frac{1}{\left(\frac{m}{K}P^2 + \frac{D}{K}P + 1\right)}$$

If D is sufficiently large this quadratic equation may be expressed in factor form as (9) $$\frac{x}{f} = \frac{1}{(25P + 1)(.25P + 1)}$$

which approximately equals the quantity

(10) $$\frac{x}{f} = \frac{1}{1 + 25P}$$

This would give a value of 6.25 for $m/K$ and 25.25 for $D/K$.

To utilize these results with a meter, applicant measured a particular rate of climb device wherein one revolution of the needle represented 4,000 feet per minute, and found that the shaft 20 must be turned 13 degrees to rotate the needle 26 one revolution, and that the torque of shaft 20 required to rotate the needle one revolution was 0.053 inch ounce per revolution. Since one revolution of the needle represents 4,000 feet per minute which is 66.6 feet per second, rotation of shaft 20 through an angle $\theta$ would correspondingly be at the rate of 0.195 degree per foot per second.

This is obtained by dividing 13 degrees by 66.6 feet per second.

This gives the velocity analogue between the dial 25 and the shaft 20.

To calculate the torque required to change the needle 26 one degree, divide 0.053 inch ounce by 360 degrees to obtain 0.0041 inch ounce per degree. This gives the torque analogue between shaft 20 and needle 26.

Since it is desired to have the ratio of acceleration to velocity equal 25, $\theta$ for the accelerometer would equal 0.19 times 25 or 4.88 degrees per feet per second squared, which equals 0.0853 radian per foot per second squared. The torque for the accelerometer would be equal to 0.0041 times 4.88 or 0.02 inch ounce per foot per second squared.

Figure 3:
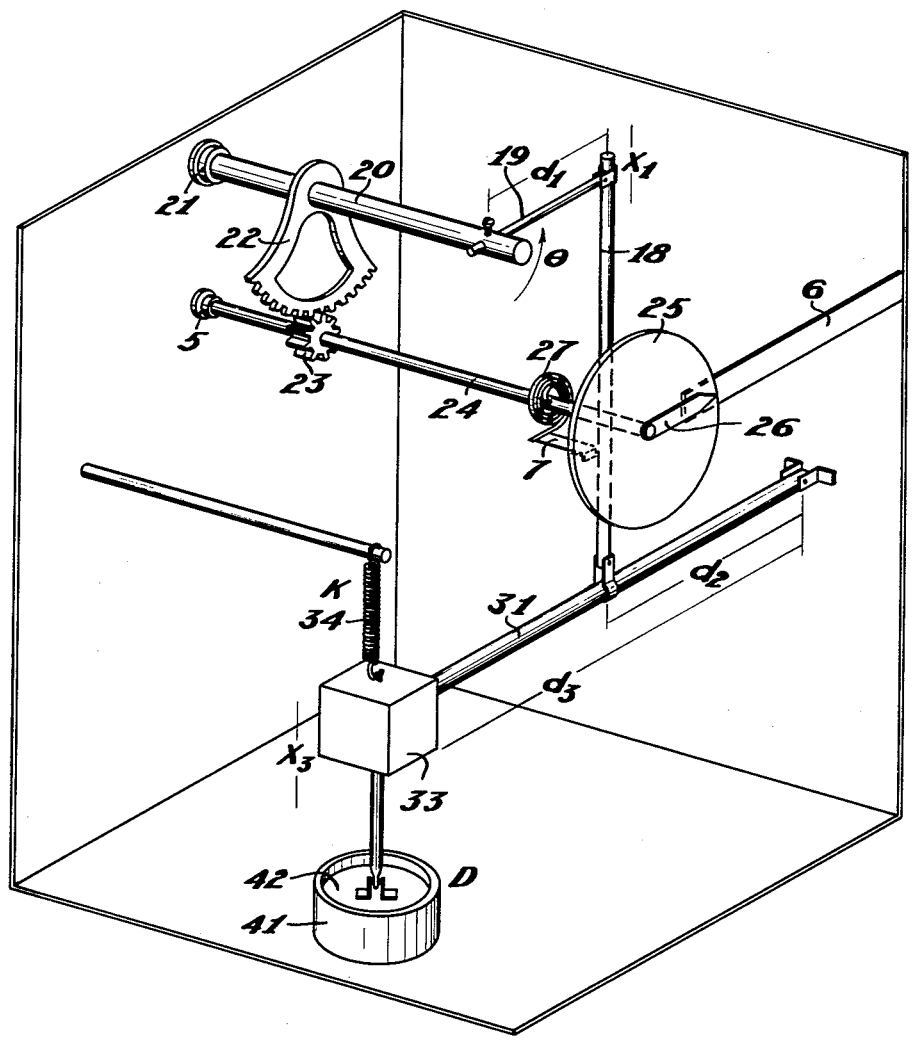
Figure 3 is a schematic view of testing apparatus used in the invention.

Figure 3 illustrates the apparatus from which design calculations may be made. The movement of the end of shaft 19 in the vertical direction is indicated as $x_1$ and is equal to $d_1$ times sin $\theta$ and the force applied at the pivot point between shafts 19 and 18 would equal

(11) $$f_1 = \frac{T \cos \theta}{d_1}$$

where T is the applied torque.

If $\theta$ is small, $x$ will equal $d_1\theta$, and $f_1$ will equal $$\frac{T}{d_1}$$

The movement of the end of shaft 31 from the zero point position may be defined as

(12) $$x_3 = \frac{d_3 d_1}{d_2}\theta$$

where $x_3$ is the vertical displacement of the end of shaft 31, $d_3$ is the length of shaft 31, $d_1$ is the length of shaft 19, $d_2$ is the distance from the pivot point of shaft 31 to the connection of block 14, and $\theta$ is the angle of rotation of shaft 20.

The total force from the spring 27 will be

(13) $$f_3 = \frac{d_2 T}{d_1 d_3}$$

The total force exerted on $d_3$ will be caused by the reaction of the spring 27 and the action of the mass 33 in combination with the springs 34 and 35 and dashpot 41. This may be stated as

(14) $$F = F_3 + f_3$$

where F is total force and $F_3$ is force from mass, springs and dashpot.

(15) $$F_3 = Kx_3 = K\frac{d_3 d_1}{d_2}\theta$$

Let it be assumed that $F_3$ is equal to ten times the force exerted by the spring 27 from the shaft 11, so that

(16) $$F_3 = 10 f_3 = 10\frac{T d_2}{d_1 d_3}$$

Then F total will approximately equal $F_3$.

The equation of motion for mass 33 is

(17) $$F_3 = \frac{W}{g}a$$

where W is the weight of the mass, $g$ is the acceleration of gravity, and "$a$" is the acceleration resulting from an applied force $F_3$.

Let "$a$" equal one foot per second squared. Then

(18) $$F_3 = \frac{W}{g} = \frac{10 T d_2}{d_1 d_3}$$

Solve for W to obtain

(19) $$W = 10 T g\left(\frac{d_2}{d_1 d_3}\right) = 10 \times .02 \cdot 32.2\left(\frac{d_2}{d_1 d_3}\right)$$

or

(20) $$W = 6.44\left(\frac{d_2}{d_1 d_3}\right)$$

(21) $$F_3 = Kx_3$$

Solve for K to obtain $$K = \frac{F_3}{x_3}$$

Substituting from Equation 16 the value of $F_3$ and from Equation 12 the value of $x_3$,

(23) $$K = 10 T\left(\frac{d_2}{d_1 d_3}\right)\frac{1}{\left(\frac{d_3 d_1 \theta}{d_2}\right)}$$

or

(24) $$K = \frac{10 T}{\theta}\left(\frac{d_2}{d_1 d_3}\right)^2 = \frac{10 \times .02}{.0853}\left(\frac{d_2}{d_1 d_3}\right)^2$$

or simply

(25) $$K = 2.35\left(\frac{d_2}{d_1 d_3}\right)^2$$

The value K in Equation 25 would be the combined spring constants of springs 34 and 35 in the actual embodiment.

Thus, all of the constants of the springs, the mass and the damping factor may be calculated. It is to be realized, of course, that the above design computations are made for a particular instrument which has a certain time lag that was measured. This procedure, however, shows how the general approach to the problem would be made so as to eliminate the time lag of a rate of climb instrument.

It is seen that the invention provides an improved rate of climb instrument which has no time lag.

Although the invention has been described with respect to a particular embodiment thereof, it is not to be so limited, as changes and modifications may be made therein which are within the full intended scope of the invention, as defined by the appended claims.

We claim:

1. A rate of climb meter which has time lag eliminated comprising, a container member, a flexible tube supported in one wall of said container member with one end open to the atmosphere external of said container, the inner end of said tube necked-down to form a small opening into the inside of the container, a block supported by said tube and formed with a central opening which is fluidily connected with said tube, a pair of diaphragms connected together at their outer peripheries and fluidly connected to the central opening of said block, a meter movement connected to one of said diaphragms, a rate of climb indicator connected to said meter movement, a first shaft pivotally supported by said container and connected to said block, a cylinder connected to said container, a piston received in said cylinder, a second shaft connected to said piston and said first shaft, a mass connected to said first shaft, and spring bias means connected to said mass and to said container.

2. A time lag compensated rate of climb indicator comprising, an airtight container member, a tube mounted in one wall of said container member with its outer end communicating with the atmosphere, the inner end of said tube necked-down to form a small opening communicating with the inside of said container, a pair of diaphragms connected together at their outer periphery and fluidly connected to said tube and supported thereby, a first shaft pivotally supported by said container member and engageable with said tube to move it up and down, a mass attached to said first shaft, spring means attached to said mass and to said container member to bias it to a zero position, a dash pot connected between said shaft and said container member, and a rate of climb meter movement connected to one of said diaphragms to indicate the vertical velocity.

3. A rate of climb indicator comprising, an air-tight container member, a flexible tube supported in one wall of said container member with one end communicating with the atmosphere, the opposite end of said tube necked-down to form a small orifice which opens into the interior of the container, a U-shaped spring supported at one end by the container member, a shaft attached to the other end of said U-shaped spring, a block attached to said shaft and said tube and fluidly connected to said tube, with the space enclosed thereby fluidly connected to said tube through the block, a meter movement attached to said bellows, a rate of climb indicator attached to said meter movement to indicate the vertical velocity, a mass attached to the end of said shaft, a pair of springs attached to opposite sides of said mass and with their opposite ends to said container member, and a dash pot connected to said shaft and to said container member for damping.

4. Means for removing the time lag of a rate of climb meter having a container member, a tube connected to the container member and communicating at one end with the outside atmosphere and the inner end necked-down and communicating with the interior of said container, including a support shaft pivotally supported to said container member and connected to said tube, a mass attached to said support shaft, a spring means connected to said container and to said mass to bias it to a zero position, and a dash pot attached to said support shaft and said container member to dampen oscillations of said support shaft.

5. A rate of climb meter comprising, an air-tight container member, a semi-flexible tube supported in said container member with one end opening into the atmosphere and the other end necked-down to form a small opening which opens into the interior of the container, a block mounted on said tube and fluidly connected thereto, a bellows attached to said block and fluidly connected to the tube through the block, a first shaft connected to the bellows, a meter movement attached to said first shaft, a rate of climb indicator for indicating the vertical velocity connected to said meter movement, a support shaft pivotally supported by said container member and connected to said block, a mass attached to one end of said support shaft and to said container member through resilient means to bias it to a neutral position, and a dash pot connected to said support shaft and said container member to dampen oscillations of the support shaft.

6. A rate of climb meter for an aircraft including a closed chamber constituting a support, an expansible bellows supported within said chamber, means defining a passage which connects the interior of said bellows to the atmosphere, a restricted passage in said chamber communicating with the atmosphere and providing a time lag before equalization of the internal and external pressures on said bellows in response to a change at atmospheric pressure, an indicator mounted on said support, a motion transmitting linkage connecting said bellows to said indicator, a resiliently constrained mass mounted on said support and subject to a displacement proportional to vertical acceleration of said support, and a motion transmitting linkage connecting said mass to said indicator to compensate for the time lag of said bellows.

7. A rate of climb instrument including a closed chamber provided with a slow leak to the atmosphere to produce a difference in the pressure within said chamber and the atmospheric pressure which is proportional to the vertical velocity of said instrument, said chamber containing differential pressure responsive means for producing a displacement relative to said chamber proportional to the said vertical velocity with an appreciable time lag after a change in said vertical velocity, accelerator means including a damped, resiliently constrained mass for producing a displacement relative to said chamber proportional to the time rate of change of said vertical velocity, an output shaft mounted relative to said chamber, and a motion transmitting linkage for combining said displacements and connected between said pressure responsive means, said accelerator means and said output shaft to produce a displacement of said output shaft proportional to the instantaneous value of said vertical velocity.

References Cited in the file of this patent

UNITED STATES PATENTS

| | | |
|---|---|---|
| 2,317,028 | Chappell et al. | Apr. 20, 1943 |
| 2,327,394 | Bevins | Aug. 24, 1943 |
| 2,445,335 | Philbrick et al. | July 20, 1948 |
| 2,564,705 | Maynard | Aug. 21, 1951 |
| 2,598,681 | Garbarini et al. | June 3, 1952 |